United States Patent
Ando

(10) Patent No.: US 12,266,778 B2
(45) Date of Patent: Apr. 1, 2025

(54) MULTILAYER SHEET AND CELL UNIT THEREWITH

(71) Applicant: SHIN-ETSU POLYMER CO., LTD., Tokyo (JP)

(72) Inventor: Hitoshi Ando, Saitama (JP)

(73) Assignee: SHIN-ETSU POLYMER CO., LTD., Tokyo (JP)

( * ) Notice: Subject to any disclaimer, the term of this patent is extended or adjusted under 35 U.S.C. 154(b) by 918 days.

(21) Appl. No.: 17/426,086

(22) PCT Filed: Nov. 17, 2020

(86) PCT No.: PCT/JP2020/042835
§ 371 (c)(1),
(2) Date: Jul. 27, 2021

(87) PCT Pub. No.: WO2021/166346
PCT Pub. Date: Aug. 26, 2021

(65) Prior Publication Data
US 2022/0320626 A1    Oct. 6, 2022

(30) Foreign Application Priority Data

Feb. 19, 2020    (JP) .................... 2020-025896

(51) Int. Cl.
*H01M 10/658* (2014.01)
*B32B 25/04* (2006.01)
(Continued)

(52) U.S. Cl.
CPC ........... *H01M 10/658* (2015.04); *B32B 25/04* (2013.01); *H01M 10/613* (2015.04);
(Continued)

(58) Field of Classification Search
CPC ............ H01M 10/658; H01M 10/613; H01M 50/204; B32B 25/04; B32B 5/32;
(Continued)

(56) References Cited

U.S. PATENT DOCUMENTS

| | | | |
|---|---|---|---|
| 2003/0008205 A1* | 1/2003 | Horie ................ | H01M 10/0562 |
| | | | 429/223 |
| 2014/0087231 A1* | 3/2014 | Schaefer .......... | H01M 10/6554 |
| | | | 429/120 |

(Continued)

FOREIGN PATENT DOCUMENTS

JP    2018206604 A    12/2018

OTHER PUBLICATIONS

International Search Report in PCT/JP2020/042835, mailed Feb. 2, 2021. 4pp.
Written Opinion in PCT/JP2020/042835, mailed Feb. 2, 2021. 4pp.

*Primary Examiner* — Harry E Arant
(74) *Attorney, Agent, or Firm* — HAUPTMAN HAM, LLP

(57) ABSTRACT

A multilayer sheet disposed at least between a plurality of heat sources and capable of conducting heat from the heat sources includes: a rubber sheet made of a rubber-like elastic body; heat insulating sheets laminated on both surfaces of the rubber sheet and capable of reducing heat conduction between the plurality of adjacent heat sources; and first heat conductive sheets laminated outside the heat insulating sheets in a separated manner and having more excellent heat conductivity than the rubber sheet and the heat insulating sheets, in which the heat insulating sheets have a bag shape wrapping the rubber sheet, and a cell unit including the multilayer sheet.

9 Claims, 16 Drawing Sheets

(51) Int. Cl.
*H01M 10/613* (2014.01)
*H01M 50/204* (2021.01)

(52) U.S. Cl.
CPC ..... *H01M 50/204* (2021.01); *B32B 2307/304* (2013.01); *B32B 2457/10* (2013.01)

(58) Field of Classification Search
CPC .. B32B 5/16; B32B 5/245; B32B 5/30; B32B 3/04; B32B 5/18; B32B 5/026; B32B 2264/108; B32B 2307/304; B32B 2457/10; B32B 2250/40; B32B 2260/021; B32B 2262/0269; B32B 2260/046; B32B 2307/3065; B32B 2266/126; B32B 2307/302; B32B 2260/025; B32B 2250/44; B32B 2266/057; B32B 2266/0207; B32B 2262/106; Y02E 60/10
See application file for complete search history.

(56) References Cited

U.S. PATENT DOCUMENTS

2014/0332193 A1* 11/2014 Oh ................... F28F 21/06
 165/185
2020/0365855 A1* 11/2020 Murayama .......... H01M 50/227

\* cited by examiner

[Figure 1]
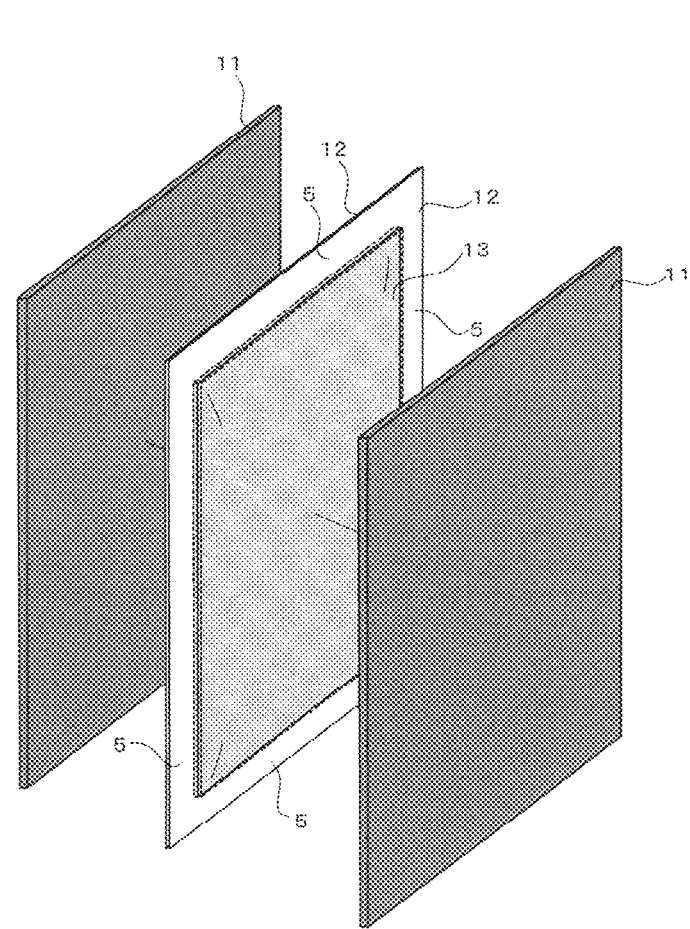

[Figure 2]
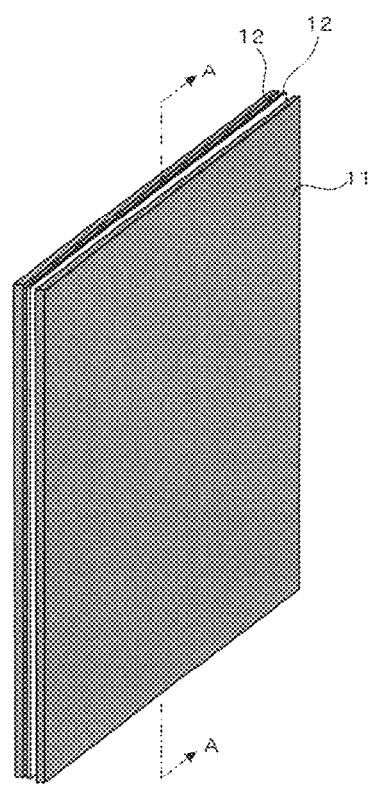

[Figure 3]
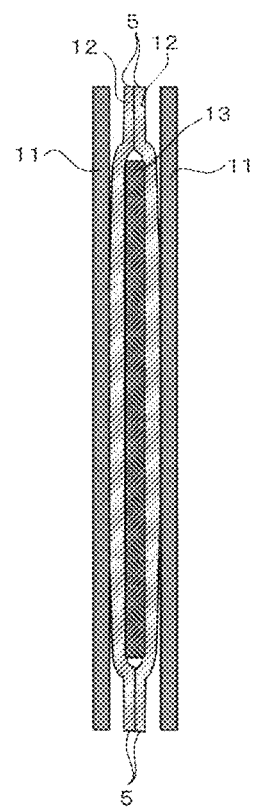

[Figure 4]
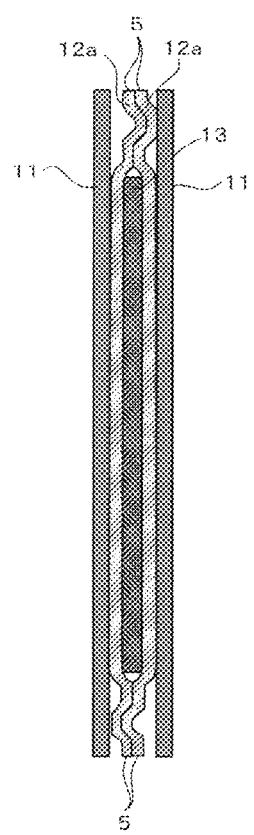

[Figure 5]
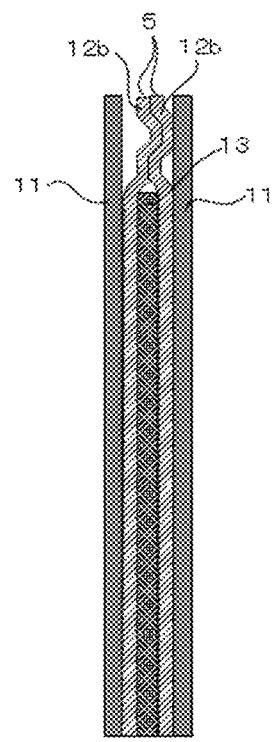

[Figure 6]
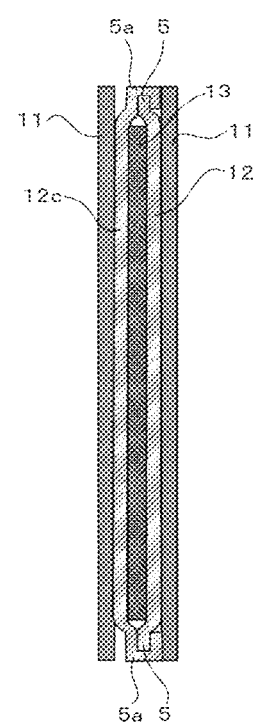

[Figure 7]
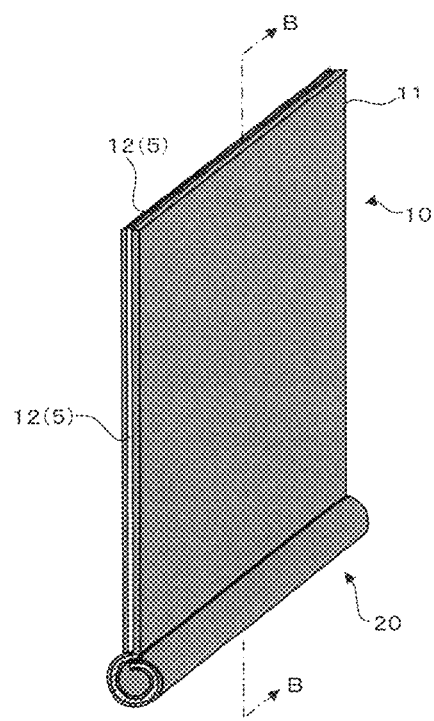

[Figure 8]
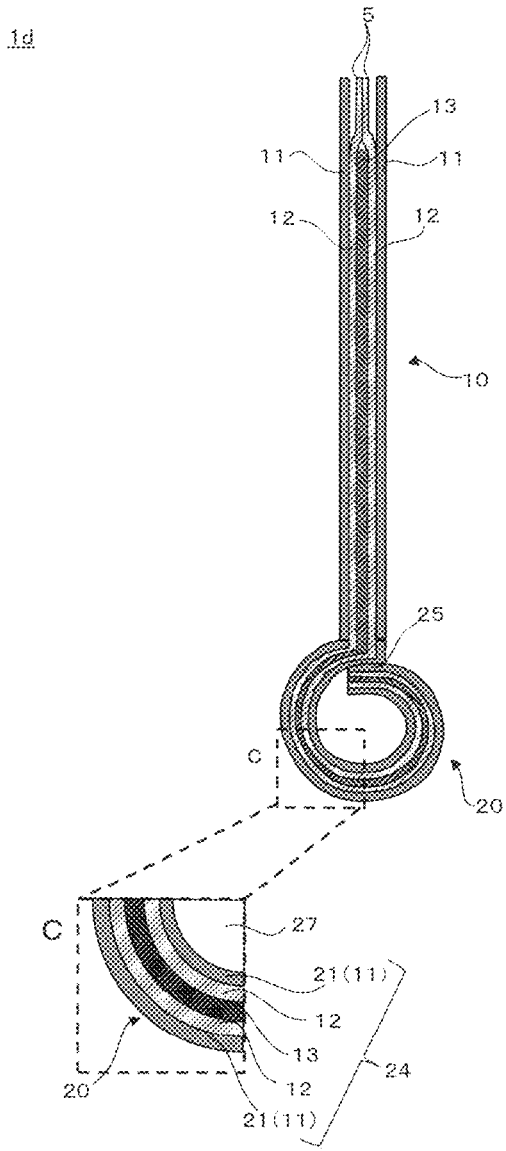

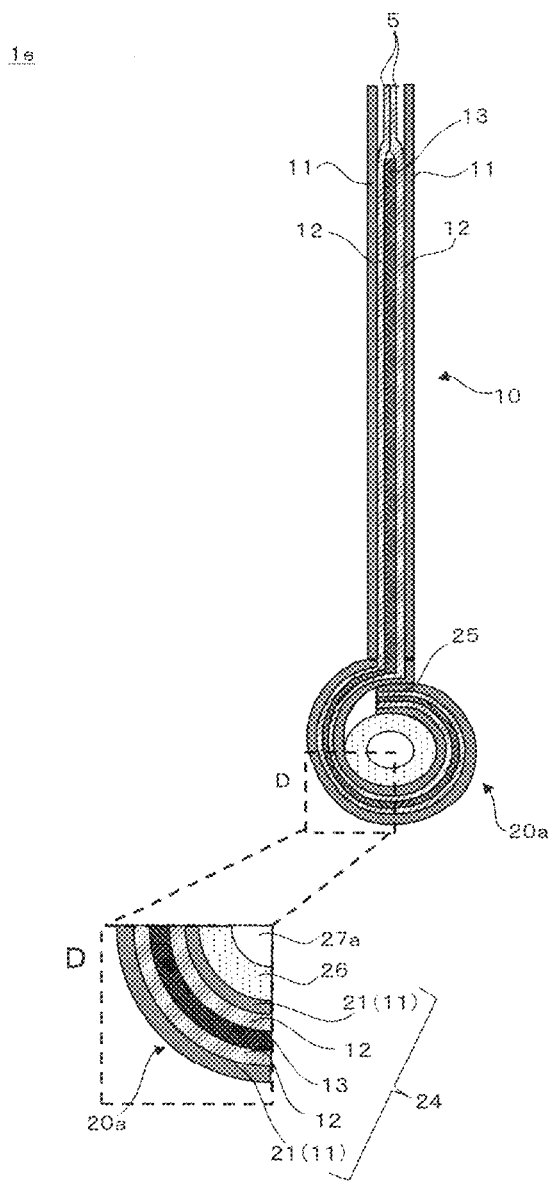
[Figure 9]

[Figure 10]
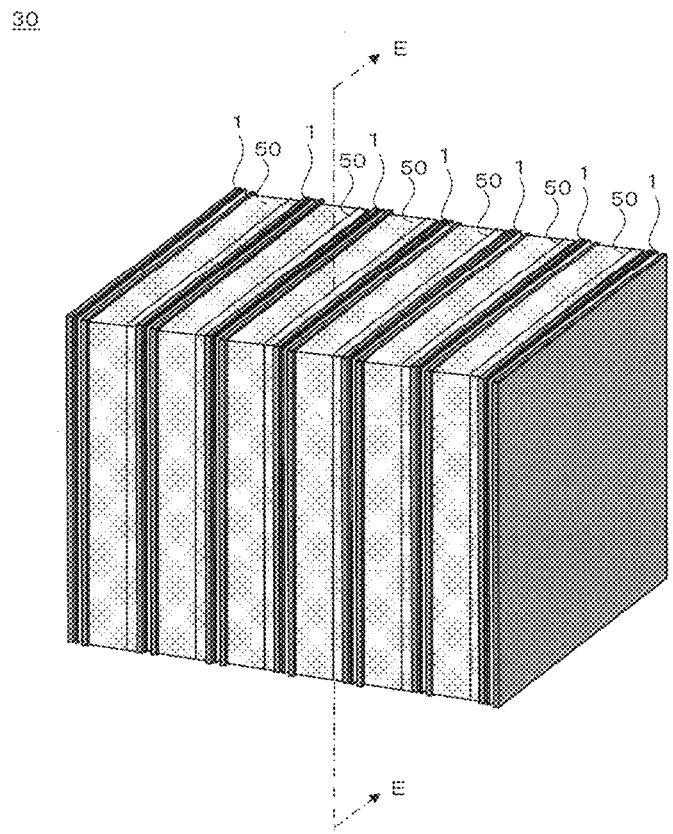
[Figure 11]
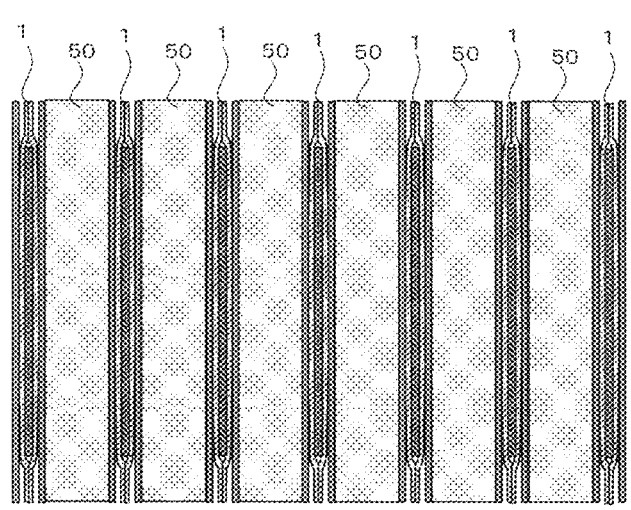

[Figure 12]
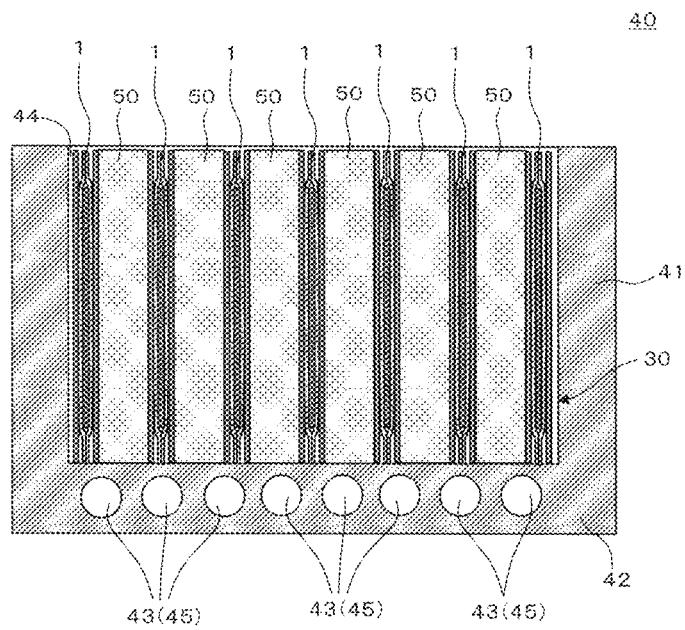
[Figure 13]
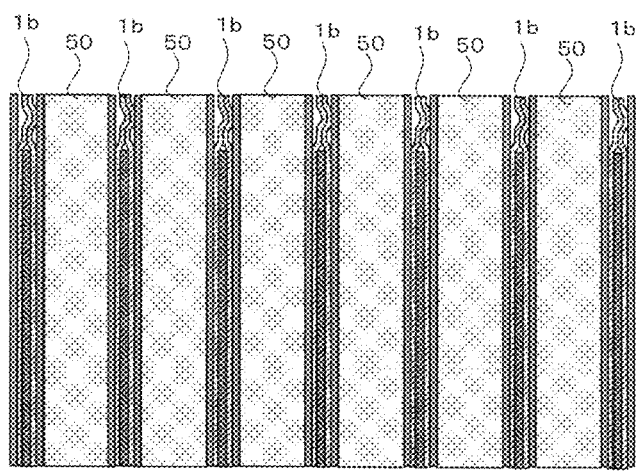

[Figure 14]
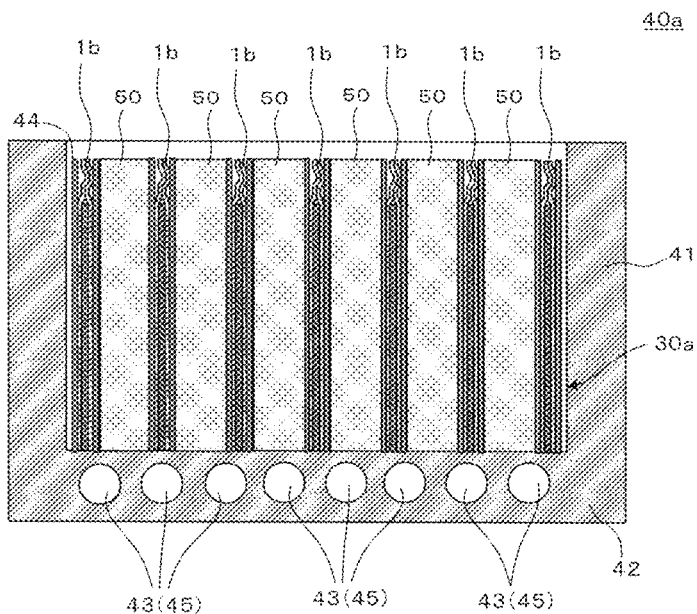
[Figure 15]
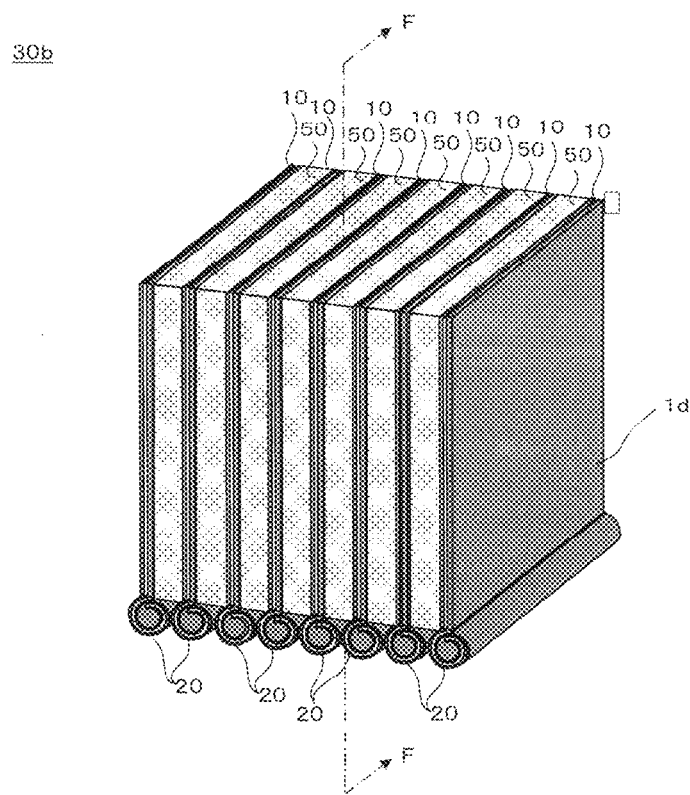

[Figure 16]
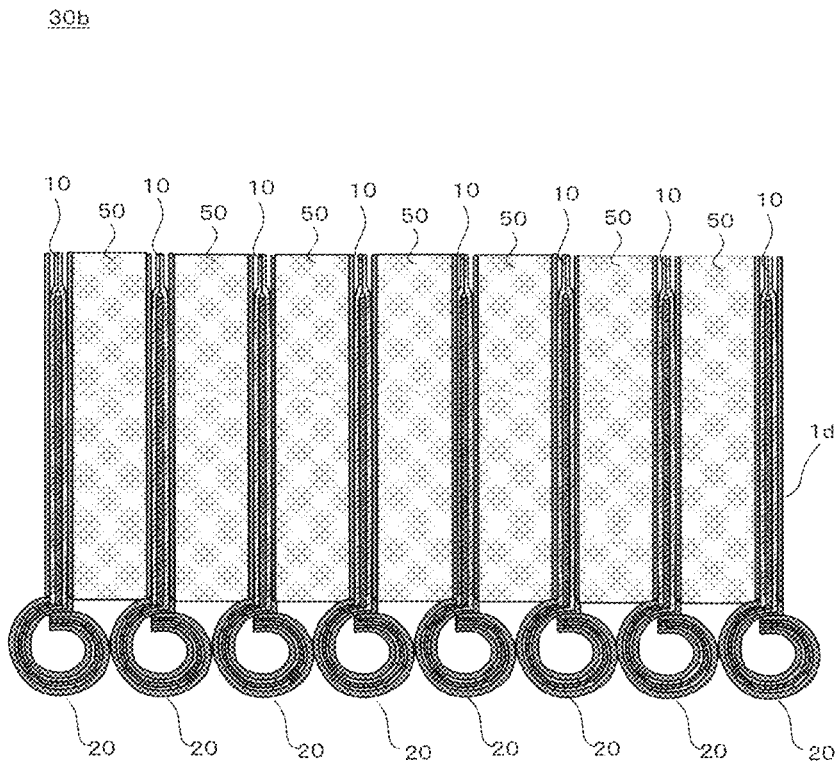
[Figure 17]
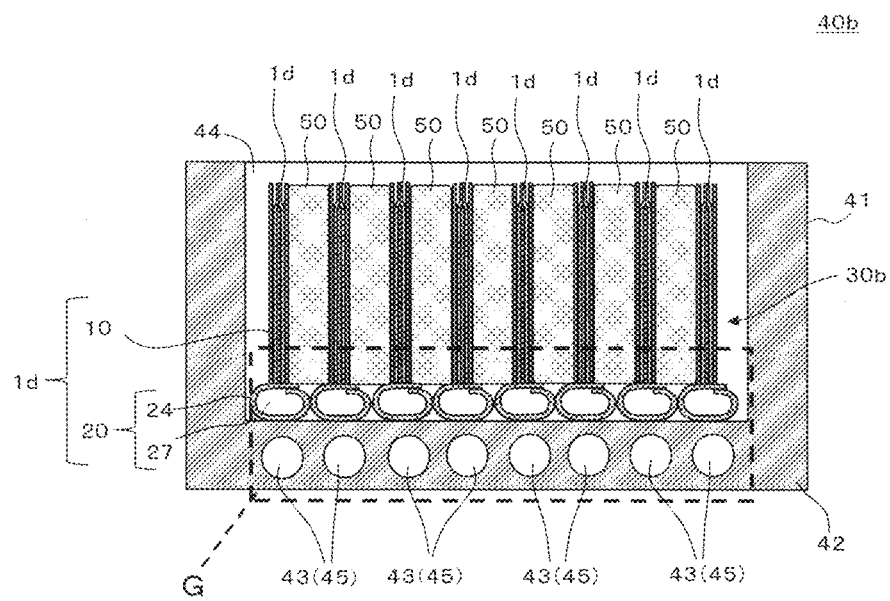

[Figure 18]
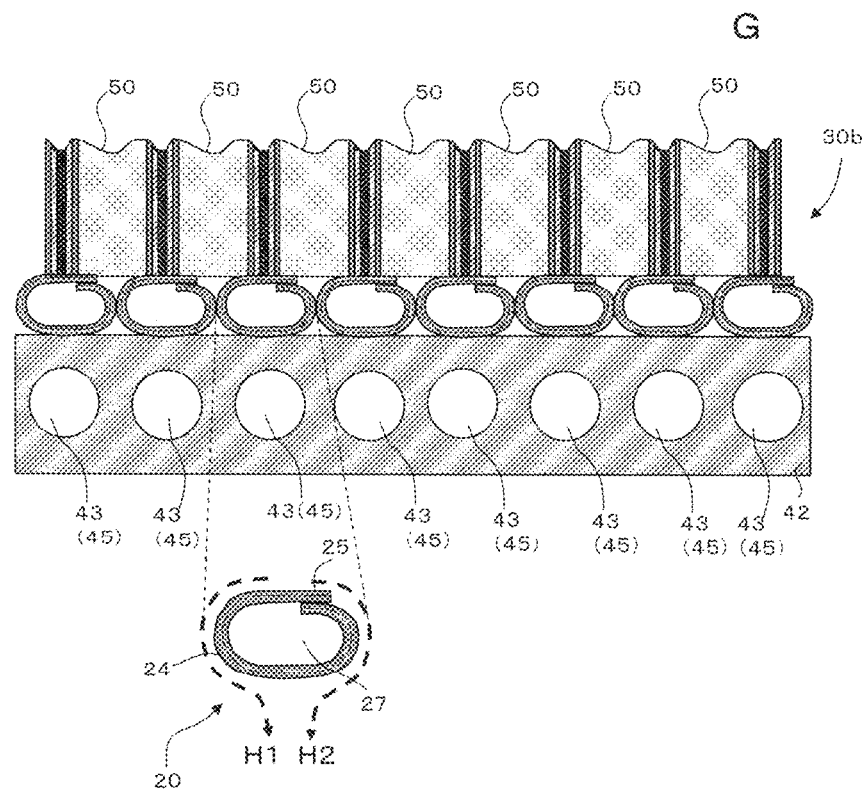

[Figure 19]
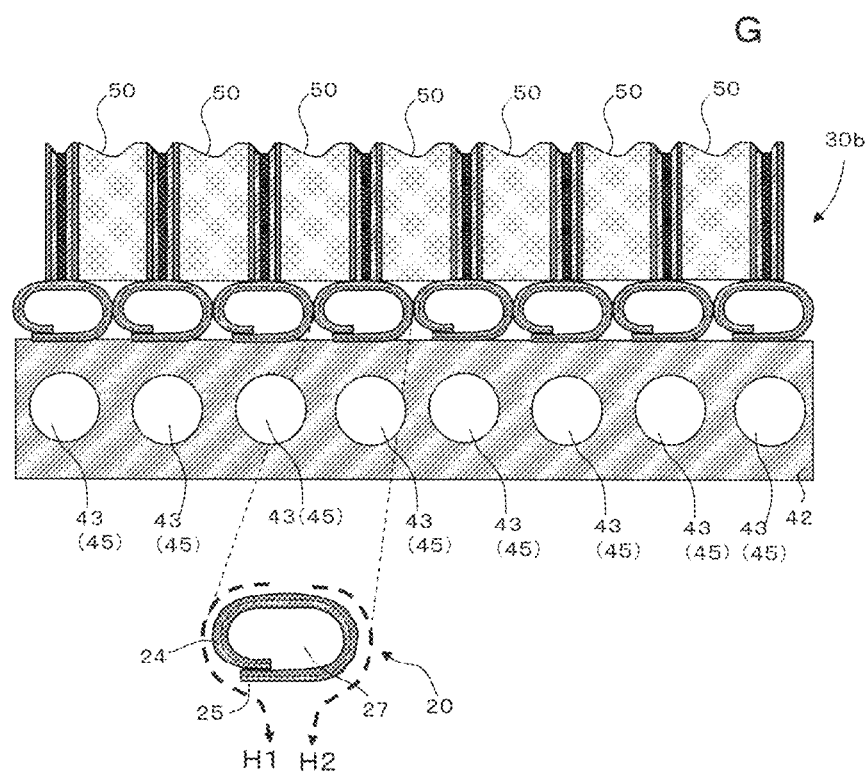

[Figure 20]
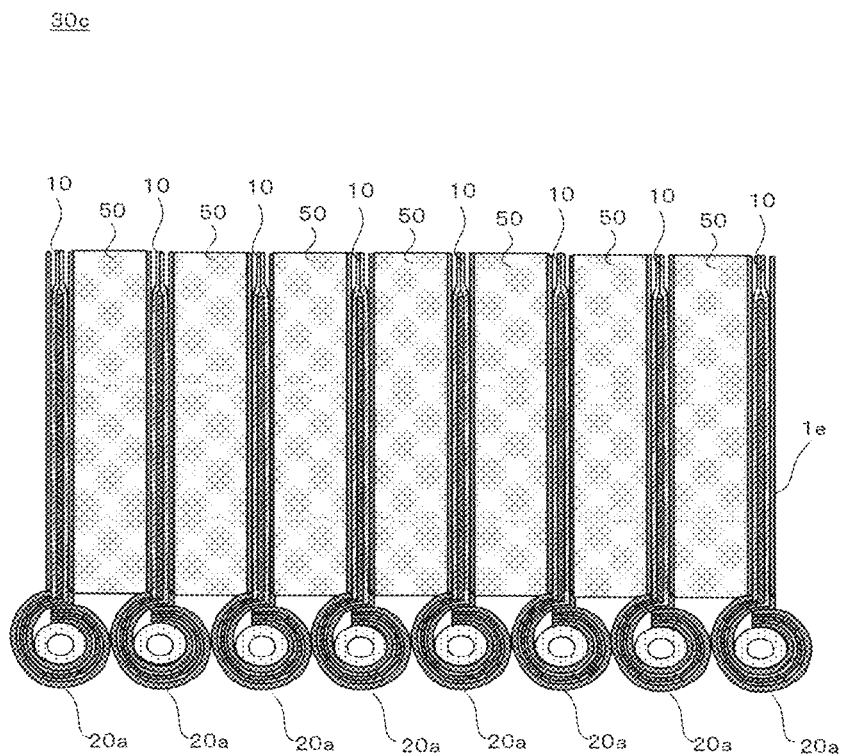
[Figure 21]
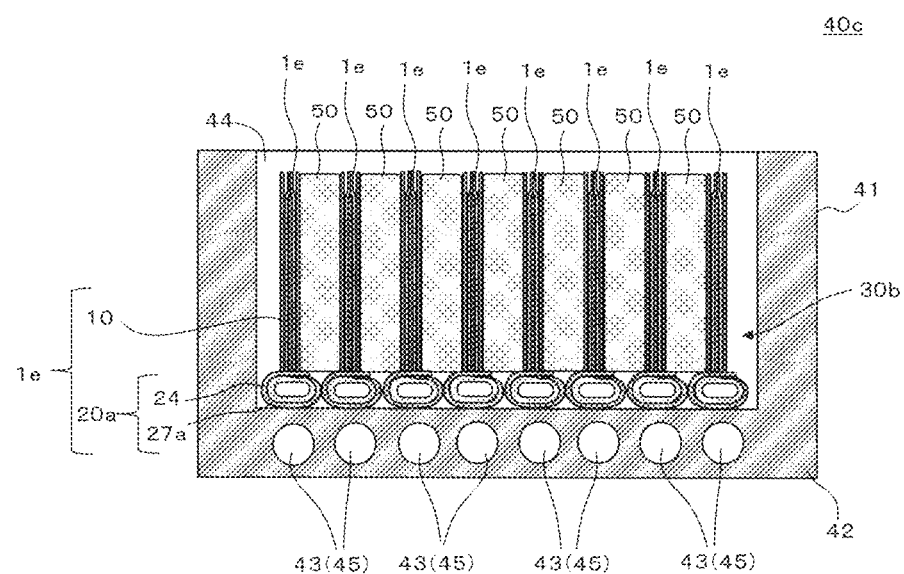

MULTILAYER SHEET AND CELL UNIT THEREWITH

CROSS REFERENCE

The present application is a National Phase of International Application No. PCT/JP2020/042835 filed Nov. 17, 2020, which claims priority on Japanese Patent Application No. 2020-025896, filed Feb. 19, 2020, the content of which is incorporated herein. Also, the content described in patents, patent applications, and literature cited in the application is incorporated herein.

TECHNICAL FIELD

The present invention relates to a multilayer sheet and a cell unit including the same.

BACKGROUND ART

In recent years, there has been a growing worldwide trend of gradually replacing conventional gasoline cars and diesel cars with electric cars for the purpose of reducing burden on the global environment. In particular, electric cars have increasingly been distributed in China as well as European countries such as France, the Netherlands, and Germany. The distribution of electric cars has problems such as development of high-performance batteries, and installation of a large number of charging stations. In particular, development of techniques for enhancing charging and discharging functions of lithium battery for car has been a major issue. It is well known that the aforementioned car batteries cannot sufficiently exhibit charging and discharging functions at a high temperature of equal to or greater than 60 degrees Celsius. Therefore, the enhancement of heat dissipation of the battery has been considered to be important.

On the other hand, there is a concern of various batteries such as car batteries causing thermal runaway due to internal short-circuiting or the like and causing firing, fuming, or the like. In recent years, a car battery in which a plurality of battery cells are attached inside a casing in an aligned manner is known. When firing, fuming, or the like occurs from one battery cell in such a battery in which a plurality of battery cells are attached in an aligned manner, there is a concern of a failure such as yet severer firing, fuming, or explosion occurring due to heat transmission to battery cells in the surroundings. In order to minimize damage due to such a failure, a method of making the heat of the battery cell heated to an abnormally high temperature unlikely to be transmitted to the battery cells in the surroundings has been studied, and for example, a method of providing a fire-proofing material, a heat insulating layer, or the like between a plurality of battery cells is known (see Patent Literature 1).

CITATION LIST

Patent Literature

Patent Literature 1: Japanese Patent Laid-Open No. 2018-206604

SUMMARY OF INVENTION

Technical Problem

As described above, there is a concern that a battery cell may expand due to heat generation when a battery cell is heated to an abnormally high temperature or causes firing. In consideration of such a point, providing a multilayer sheet in which fire-proofing materials, heat insulating layers, and the like are laminated on both surfaces of a rubber sheet between a plurality of battery cells in a battery as described above, for example, is conceivable. With such a configuration, it is possible to reduce influences of deformation of the battery cells due to expansion by the rubber sheet following the deformation of the battery cells. However, since the battery including such a multilayer sheet has a configuration in which the fire-proofing material, the heat insulating layer, and the like are not laminated on an end surface of the rubber sheet and the end surface is exposed, there is a concern of firing from the end surface of the rubber sheet.

Therefore, it is necessary to curb heat transmission between the battery cells and between the battery cells and the rubber sheet when the battery cells are heated at an abnormally high temperature or cause firing. On the other hand, enhancing efficiency of heat transmission from heat sources such as the battery cells to cooling portions is desired at a normal time when the battery cells are not heated to an abnormally high temperature or do not cause firing. The aforementioned requirement is a requirement not only for battery cells but also for other heat sources such as a circuit substrate, an electronic component, or an electronic device main body.

The present invention was made in view of the aforementioned problem, and an object thereof is to provide a multilayer sheet capable of reducing heat conduction between a plurality of heat sources and between the heat sources and a rubber sheet and enhancing efficiency of heat transmission from the heat sources to cooling portions and a cell unit including the multilayer sheet.

Solution to Problem (1) A multilayer sheet in an embodiment to achieve the aforementioned object is a multilayer sheet disposed at least between a plurality of heat sources and capable of conducting heat from the heat sources, including: a rubber sheet made of a rubber-like elastic body; heat insulating sheets laminated on both surfaces of the rubber sheet and capable of reducing heat conduction between the plurality of adjacent heat sources; and first heat conductive sheets laminated outside the heat insulating sheets in a separated manner and having more excellent heat conductivity than the rubber sheet and the heat insulating sheets, in which the heat insulating sheets have a bag shape wrapping the rubber sheet.

(2) In the multilayer sheet in another embodiment, it is preferable that the heat insulating sheets have bonded parts extending outward beyond an edge part of the rubber sheet, and the bonded parts facing each other with the rubber sheet interposed therebetween be bonded to each other.

(3) In the multilayer sheet in another embodiment, it is preferable that irregularities be formed in a state where the bonded parts are bonded to each other.

(4) In the multilayer sheet in another embodiment, it is preferable that in the heat insulating sheets, at least one bonded part of the two bonded parts facing each other with the rubber sheet interposed therebetween be folded back on a side of the other bonded part and be bonded to the other bonded part.

(5) It is preferable that the multilayer sheet in another embodiment further include: a heat conductive member that is long in a length direction of end surfaces of the first heat conductive sheets in contact with at least the end surfaces, and the heat conductive member include a second heat conductive sheet covering an outer surface thereof.

(6) In the multilayer sheet in another embodiment, it is preferable that the heat conductive member include a hollow part along a length direction thereof, and the heat conductive member be a tubular member wound more than one time around an outer circumference of the hollow part in a non-contact state.

(7) In the multilayer sheet in another embodiment, it is preferable that the heat conductive member include a cushion member that is included inside the second heat conductive sheet and is more easily deformed than the second heat conductive sheet.

(8) In the multilayer sheet in another embodiment, it is preferable that the heat conductive member include a hollow part along a length direction thereof, and the cushion member be a tubular cushion member including the hollow part that is long in the length direction of the heat conductive member.

(9) In the multilayer sheet in another embodiment, it is preferable that the first heat conductive sheets and the second heat conductive sheet be a continuous sheet.

(10) In the multilayer sheet in another embodiment, it is preferable that the heat conductive member be formed by the rubber sheet, the heat insulating sheets, and the first heat conductive sheets being extended.

(11) In the multilayer sheet in another embodiment, it is preferable the heat insulating sheet be a sheet of silica aerogel or a sheet containing silica aerogel.

(12) In the multilayer sheet in another embodiment, it is preferable that the rubber sheet be a sheet containing silicone rubber.

(13) In the multilayer sheet in another embodiment, it is preferable that the rubber sheet be a sheet of foamed rubber.

(14) A cell unit in an embodiment includes: a plurality of cells as heat sources; and any one of the aforementioned multilayer sheets disposed at least between the plurality of cells.

Advantageous Effect of Invention

According to the present invention, it is possible to provide a multilayer sheet capable of reducing heat conduction between a plurality of heat sources and between the heat sources and a rubber sheet and enhancing efficiency of heat transmission from the heat sources to cooling portions and a cell unit including the multilayer sheet.

BRIEF DESCRIPTION OF DRAWINGS

FIG. 1 illustrates a partially exploded perspective view of a multilayer sheet in a first embodiment.

FIG. 2 illustrates a perspective view of the multilayer sheet in the first embodiment.

FIG. 3 illustrates a sectional view along the line A-A in FIG. 2.

FIG. 4 illustrates a sectional view of a multilayer sheet in a second embodiment in the same view as that in FIG. 3.

FIG. 5 illustrates a sectional view of a multilayer sheet in a third embodiment in the same view as that in FIG. 3.

FIG. 6 illustrates a sectional view of a multilayer sheet in a fourth embodiment in the same view as that in FIG. 3.

FIG. 7 illustrates a perspective view of a multilayer sheet in a fifth embodiment.

FIG. 8 illustrates each of a sectional view along the line B-B in FIG. 7 and an enlarged view of a region C thereof.

FIG. 9 illustrates each of a sectional view of a multilayer sheet in a sixth embodiment in the same view as that in FIG. 2 and an enlarged view of a region D thereof.

FIG. 10 illustrates a perspective view of a cell unit in the first embodiment.

FIG. 11 illustrates a sectional view along the line E-E in FIG. 10.

FIG. 12 illustrates a vertical sectional view of a battery including the cell unit in the first embodiment.

FIG. 13 illustrates a sectional view of a cell unit in the second embodiment in the same view as that in FIG. 11.

FIG. 14 illustrates a vertical sectional view of a battery including the cell unit in the second embodiment.

FIG. 15 illustrates a perspective view of a cell unit in the third embodiment.

FIG. 16 illustrates a sectional view along the line F-F in FIG. 15.

FIG. 17 illustrates a vertical sectional view of a battery including the cell unit in the third embodiment.

FIG. 18 illustrates an enlarged view of a region G in FIG. 17.

FIG. 19 illustrates an enlarged view of a region similar to the region G in FIG. 17 in a modification example of a battery including the cell unit in the third embodiment.

FIG. 20 illustrates a sectional view of a cell unit in the fourth embodiment in the same view as that in FIG. 16.

FIG. 21 illustrates a vertical sectional view of a battery including the cell unit in the fourth embodiment.

REFERENCE SIGNS LIST 1, 1a, 1b, 1c, 1d, 1e Multilayer sheet
5, 5a Bonded part
11 First heat conductive sheet
12, 12a, 12b, 12c Heat insulating sheet
13 Rubber sheet
20, 20a Heat conductive member
21 Second heat conductive sheet
26 Cushion member (tubular cushion member is an example thereof)
27, 27a Hollow part
30, 30a, 30b, 30c Cell unit
50 Cell (an example of heat source)

Embodiments

Next, each embodiment of the present invention will be described with reference to the drawings. Note that each embodiment described below is not intended to limit the invention of the claims and all elements and combination thereof described in each embodiment are not necessarily essential for a solution of the present invention.
1. Multilayer Sheet First Embodiment FIG. 1 illustrates a partially exploded perspective view of a multilayer sheet in a first embodiment. FIG. 2 illustrates a perspective view of the multilayer sheet in the first embodiment. FIG. 3 illustrates a sectional view along the line A-A in FIG. 2.
(1) Overview Configuration of Multilayer Sheet A multilayer sheet 1 in this embodiment is a sheet disposed at least between a plurality of (two in this case) heat sources and is capable of conducting heat from the heat sources. The multilayer sheet 1 includes a rubber sheet 13, heat insulating sheets 12 laminated on both surfaces of the rubber sheet 13 and capable of reducing heat conduction between the plurality of adjacent heat sources, and first heat conductive sheets 11 laminated outside the heat insulating sheets 12 in a separated manner and having more excellent heat conductivity than the rubber sheet 13 and the heat insulating sheets 12. Also, the heat insulating sheets 12 have a bag shape wrapping the rubber sheet 13.

Next, each component of the multilayer sheet 1 will be described.

(2) First Heat Conductive Sheets

The first heat conductive sheets 11 are sheets laminated outside the heat insulating sheets 12 in a separated manner, that is, sheets forming the outermost layers of the multilayer sheet 1. Although any constituent material can be used, the first heat conductive sheets 11 are preferably sheets containing carbon and are further preferably sheets, 90% by mass or more of which is carbon. For example, films made of graphite and obtained by baking a resin can also be used as the first heat conductive sheets 11. However, the first heat conductive sheets 11 may be sheets containing carbon and a resin. In that case, the resin may be synthetic fiber. In that case, aramid fiber can be suitably used as the resin. "Carbon" herein is broadly interpreted as including carbon (element symbol: C) with any structures such as graphite, carbon black with lower crystallinity than graphite, diamond, or diamond-like carbon having a structure similar to that of diamond. The first heat conductive sheets 11 can be thin sheets obtained by hardening a material in which graphite fiber or carbon particles are blended and dispersed in a resin in this embodiment. The first heat conductive sheets 11 may be carbon fiber knitted in a mesh form or may further be mix-yarned or may be mix-knitted. Various fillers such as graphite fiber, carbon particles, and carbon fiber are all included in the concept of the carbon filler.

When the first heat conductive sheets 11 are formed as sheets including carbon and a resin, the amount of resin may exceed 50% by mass or may be equal to or less than 50% by mass with respect to the total mass of the first heat conductive sheets 11. In other words, whether the first heat conductive sheets 11 contain the resin as a main material does not matter unless there is no big problem in heat conduction. Examples of the resin that can be suitably used include a thermoplastic resin. A resin having such a high melting point that the resin is not melted when heat from the heat sources is conducted is preferably used as the thermoplastic resin, and suitable examples thereof include polyphenylene sulfide (PPS), polyether ether ketone (PEEK), polyamide-imide (PAI), aromatic polyamide (aramid fiber). The resin is dispersed in a form of particles or fiber, for example, in gaps of the carbon filler in a state before molding of the first heat conductive sheets 11. In the first heat conductive sheets 11, AlN or diamond may be disposed as a filler for further enhancing heat conduction in addition to the carbon filler and the resin. Also, a more flexible elastomer than the resin may be used instead of the resin. The first heat conductive sheets 11 can be sheets containing metal and/or ceramics instead of or in addition to the aforementioned carbon. As the metal, aluminum, copper, an alloy containing at least one of aluminum and copper, or the like which has relatively high heat conductivity can be selected. As the ceramics, $Al_2O_3$, AlN, cBN, hBN, or the like which has relatively high heat conductivity can be selected.

Whether the first heat conductive sheets 11 have excellent electrical conductivity does not matter. The heat transfer rate of the first heat conductive sheet 11 is preferably equal to or greater than 10 W/mK. In this embodiment, the first heat conductive sheets 11 are preferably films made of graphite and are made of a material with excellent heat conductivity and electrical conductivity. The first heat conductive sheets 11 are preferably sheets with excellent curving properties (or bending properties), and the thickness is preferably 0.02 to 3 mm and is more preferably 0.1 to 0.5 mm although the thickness is not limited. However, since the amount of heat transmission increases as the thickness increases although the heat transfer rate of the first heat conductive sheets 11 decreases in the thickness direction as the thickness increases, the thickness is preferably determined by comprehensively considering strength, flexibility, and heat conductivity of the sheet. Although the size of the surfaces of the first heat conductive sheets 11 on which the first heat conductive sheets 11 are laminated on the heat insulating sheets 12 is not limited, the size is preferably equal to or less than the size of the lamination surfaces of the heat insulating sheets 12 and is more preferably a size that is equivalent to the lamination surfaces of the heat insulating sheets 12. However, the size of the surfaces of the first heat conductive sheets 11 on which the first heat conductive sheets 11 are laminated on the heat insulating sheets 12 is preferably determined in consideration of the size of the heat sources and the like.

(3) Heat Insulating Sheets

The heat insulating sheets 12 are sheets laminated inside the first heat conductive sheets 11 and outside the rubber sheet 13. The heat insulating sheets 12 preferably include bonded parts 5 extending outward beyond an edge part of the rubber sheet 13. In the multilayer sheet 1, the bonded parts 5 facing each other with the rubber sheet 13 interposed therebetween are preferably bonded to each other. The bonded parts 5 may be bonded via thermal compression bonding or may be bonded using a fixing means such as a heat-resistant adhesive or a double-sided tape. In this embodiment, each heat insulating sheet 12 includes four bonded parts 5 respectively extending outward from four sides forming the outer circumference of the rubber sheet 13. In other words, the heat insulating sheets 12 have a tightly sealing shape in which the four bonded parts 5 are bonded to the respectively facing bonded parts 5 with the rubber sheet 13 interposed therebetween (see FIG. 2). Note that since the sectional view of the multilayer sheet 1 in a direction vertical to the section along the line A-A (see FIG. 2) is similar to that in FIG. 3, illustration is omitted. The same applies to the following embodiments. Also, the form of the heat insulating sheets 12 is not limited as long as the heat insulating sheets 12 have a bag shape wrapping the rubber sheet 13, and for example, a form in which each heat insulating sheet 12 includes three bonded parts 5 respectively extending outward from three sides out of four sides forming the outer circumference of the rubber sheet 13 and the three bonded parts 5 are bonded to corresponding bonded parts 5 may be employed. In this case, the heat insulating sheets 12 have a bag shape opened on the sides where no bonded parts 5 are provided.

The heat insulating sheets 12 are preferably silica aerogel containing sheet-shaped fiber mass as a support. As the sheet-shaped fiber mass, it is possible to use glass fiber; ceramic fiber such as silica fiber, alumina fiber, titania fiber, or silicon carbide fiber; metal fiber; artificial mineral fiber such as rock wool or basalt fiber; carbon fiber; or a sheet-shaped molded article such as a non-woven cloth, a mat or a felt obtained by forming a whisker or the like into a paper shape or a board shape by a paper making method or appropriately adding a binder and molding the material into a sheet shape. Among these, a support that can hold the shape of the support even at a heat-resistant temperature (about 750° C.) of silica aerogel is more preferably used in order to effectively obtain a heat-resistant effect of silica aerogel. Porosity of silica aerogel is preferably equal to or greater than 60% and is more preferably equal to or greater than 80%. It is only necessary that the sheet-shaped fiber mass be simply impregnated with silica aerogel and silica aerogel be dispersed therein, or silica aerogel may be supported in the form of constituent fiber in the sheet-shaped fiber mass using a binder or the like. The heat insulating sheets 12 are not particularly limited as long as the heat insulating sheets 12 are sheets containing silica aerogel and may be sheets further containing a material other than silica aerogel containing a sheet-shaped fiber mass as a support.

The heat transfer rate of the heat insulating sheets 12 is preferably equal to or less than 0.2 W/mK and is more preferably equal to or less than 0.1 W/mK. The heat insulating sheets 12 have excellent heat insulating properties due to convection in pores based on the support and the low heat transfer rate. Although the thickness of the heat insulating sheets 12 is not limited, the thickness is preferably 0.1 to 2 mm and is more preferably 0.3 to 1.0 mm. However, since the amount of silica and air layer supported decreases as the thickness of the heat insulating sheets 12 decreases, heat insulating properties are degraded. Therefore, the thickness of the heat insulating sheets 12 is preferably determined by comprehensively considering strength, flexibility, and heat insulating properties of the sheet. The size of the bonded parts 5 is not particularly limited as long as the bonded parts 5 have a size with which the bonded parts 5 can be bonded to each other. As the heat insulating sheets 12, sheets including one of or two or more of steatite ($MgO \cdot SiO_2$), zirconia ($ZrO_2$), cordierite ($2MgO \cdot 2Al_2O_3 \cdot 5SiO_2$), forsterite ($2MgO \cdot SiO_2$), and mullite ($3Al_2O_3 \cdot 2SiO_2$) in addition to silica aerogel may be used.

(4) Rubber Sheet

The rubber sheet 13 is a sheet laminated inside the heat insulating sheets 12, that is, a sheet disposed to be interposed between the heat insulating sheets 12. At least a part of the rubber sheet 13 is wrapped by the heat insulating sheets 12. The rubber sheet 13 is a sheet made of a rubber-like elastic body. Instead of the term "rubber-like elastic body", a term "an elastic body" or a "cushion member" may be used. The rubber sheet 13 has a function of exhibiting cushion properties between the plurality of heat sources and enhancing tight adhesion between the heat sources and the first heat conductive sheets 11 and a function as a protective member to prevent the first heat conductive sheets 11 and the heat insulating sheets 12 from breaking due to a load applied to the first heat conductive sheets 11 and the heat insulating sheets 12. The rubber sheet 13 is a member with lower heat conductivity than the first heat conductive sheet 11.

Although the rubber sheet 13 may be either a sponge-shaped member containing air bubbles therein or a rubber-like elastic body that does not contain air bubbles, the rubber sheet 13 is preferably a sponge-shaped member. The rubber sheet 13 is preferably configured to contain a thermosetting elastomer such as silicone rubber, urethane rubber, isoprene rubber, ethylene-propylene rubber, natural rubber, ethylene-propylene-diene rubber, nitrile rubber (NBR), or styrene-butadiene rubber (SBR); a urethane-based, ester-based, styrene-based, olefin-based, butadiene-based, fluorine-based thermoplastic elastomer or the like; a composite thereof; or the like. The rubber sheet 13 is preferably configured with a material with high heat-resistant properties in such a level in which the rubber sheet 13 can maintain the form without causing melting, decomposition, or the like due to heat transmitted through the first heat conductive sheets 11 and the heat insulating sheets 12. In this embodiment, the rubber sheet 13 is more preferably a silicone sponge sheet that is a silicone rubber foam sheet. The rubber sheet 13 may be configured such that a filler, representative examples of which include $Al_2O_3$, AlN, cBN, hBN, and diamond particles, is dispersed in rubber in order to enhance the heat conductivity thereof even a little bit.

The first heat conductive sheets 11, the heat insulating sheets 12, and the rubber sheet 13 may be secured using a fixing means such as a heat-resistant adhesive or a double-sided tape or may be secured without using any fixing means.

According to the multilayer sheet 1 with such a structure, the heat insulating sheets 12 can reduce heat conduction between the plurality of heat sources even when the multilayer sheet 1 is disposed between the plurality of heat sources. Since the bonded parts 5 of the heat insulating sheets 12 are bonded to each other to wrap the rubber sheet 13, it is possible to reduce heat conduction between the heat sources and the rubber sheet 13 and to prevent burning of the rubber sheet 13.

Second Embodiment

Next, a multilayer sheet in a second embodiment will be described. The same reference signs will be applied to parts common to those in the above embodiment, and repeated description will be omitted.

FIG. 4 illustrates a sectional view of the multilayer sheet in the second embodiment in the same view as that in FIG. 3.

Although a multilayer sheet 1a in the second embodiment has a structure similar to that of the multilayer sheet 1 in the first embodiment, the multilayer sheet 1a is different from the multilayer sheet 1 in the first embodiment in that the multilayer sheet 1a includes heat insulating sheets 12a instead of the heat insulating sheets 12.

Since the heat insulating sheets 12a have a configuration similar to that of the heat insulating sheet 12 in the first embodiment other than a bonding method of the bonded parts 5, detailed description will be omitted. Each heat insulating sheet 12a includes four bonded parts 5 respectively extending outward from four sides forming an outer circumference of a rubber sheet 13 similarly to each heat insulating sheet 12 in the first embodiment. The multilayer sheet 1a forms irregularities in a state where the bonded parts 5 facing each other with the rubber sheet 13 interposed therebetween are bonded to each other. In other words, the heat insulating sheets 12a form the irregularities in a state where the four bonded parts 5 are bonded to the respectively facing bonded parts 5 with the rubber sheet 13 interposed therebetween. The bonded parts 5 may be bonded via thermal compression bonding or may be bonded using a fixing means such as a heat-resistant adhesive or a double-sided tape. The bonded parts 5 are more firmly bonded to each other, and the multilayer sheet 1a can further reduce heat conduction between the heat sources and the rubber sheet 13 and can prevent burning of the rubber sheet 13 by forming the irregularities in the state in which the bonded parts 5 are bonded to each other. Note that the number of irregularities is not limited as long as the bonded parts 5 of the heat insulating sheets 12a form at least one or more irregularities. The shape of the irregularities of the bonded parts 5 is not limited to a rectangular shape and may be, for example, a semicircular shape, a triangular shape, a polygonal shape, or the like. The height of the irregularities formed by the bonded parts 5 is preferably 1.0 mm to 5.0 mm and is more preferably 1.5 mm to 2.5 mm. Also, the width of the irregularities formed by the bonded parts 5 is preferably 1.0 to 10 mm and is more preferably 2.0 mm to 4.0 mm.

Third Embodiment

Next, a multilayer sheet in a third embodiment will be described. The same reference signs will be applied to parts common to those in the above embodiments, and repeated description will be omitted.

FIG. 5 illustrates a sectional view of the multilayer sheet in the third embodiment in the same view as that in FIG. 3.

Although a multilayer sheet 1b in the third embodiment has a structure similar to that of the multilayer sheet 1a in the second embodiment, the multilayer sheet 1b is different from the multilayer sheet 1a in the second embodiment in that the multilayer sheet 1b includes heat insulating sheets 12b instead of the heat insulating sheets 12a.

Each heat insulating sheet 12b includes three bonded parts 5 respectively extending from three sides (three sides other than the lower side in this embodiment) out of four sides forming an outer circumference of a rubber sheet 13. Also, the heat insulating sheets 12b form irregularities in a state in which the three bonded parts 5 are bonded to facing bonded parts 5 with the rubber sheet 13 interposed therebetween. In other words, the heat insulating sheets 12b have a bag shape opened on the side where no bonded parts 5 are provided (the lower sides in this embodiment). Therefore, the multilayer sheet 1b is configured such that the heat insulating sheets 12b with a bag shape wrap the rubber sheet 13. The multilayer sheet 1b configured in this manner has effects similar to those of the aforementioned embodiments when the lower side comes into contact with the cooling portion side. Note that a sectional view of the multilayer sheet 1b in the same view as the section in the direction perpendicular to the section along the line A-A (see FIG. 2) is similar to the sectional view of the multilayer sheet 1a in the second embodiment (see FIG. 4), illustration will be omitted.

Fourth Embodiment

Next, a multilayer sheet in a fourth embodiment will be described. The same reference signs will be applied to parts common to those in the above embodiments, and repeated description will be omitted.

FIG. 6 illustrates a sectional view of a multilayer sheet in a fourth embodiment in the same view as that in FIG. 3.

Although a multilayer sheet 1c in the fourth embodiment has a structure similar to that of the multilayer sheet 1 in the first embodiment, the multilayer sheet 1c is different from the multilayer sheet 1 in the first embodiment in that a heat insulating sheet 12c is laminated on one surface of a rubber sheet 13 instead of the heat insulating sheets 12.

In the multilayer sheet 1c, the heat insulating sheet 12 of the first embodiment is laminated on one surface of the rubber sheet 13 while the heat insulating sheet 12c is laminated on the other surface. In the multilayer sheet 1c, first heat conductive sheets 11 are laminated outside the heat insulating sheets 12 and 12c in a separated manner. The heat insulating sheet 12c includes four bonded parts 5a respectively extending outward from four sides forming an outer circumference of a rubber sheet 13. The bonded parts 5a extend outward beyond the bonded parts 5 of the heat insulating sheet 12. In the multilayer sheet 1c, the bonded parts 5a of the heat insulating sheet 12c from among the bonded parts 5 and 5a facing each other with the rubber sheet 13 interposed therebetween are folded back on the side of the bonded parts 5 of the heat insulating sheet 12 and are bonded to the bonded parts 5. In other words, in the multilayer sheet 1c, the four bonded parts 5a of the heat insulating sheet 12c are folded back on the side of the respectively facing bonded parts 5 of the heat insulating sheet 12 with the rubber sheet 13 interposed therebetween and are bonded to the bonded part 5. The bonded parts 5 and 5a may be bonded via thermal compression bonding or may be bonded using a fixing means such as a heat-resistant adhesive or a double-sided tape. Note that the form of the heat insulating sheets 12 and 12c is not limited as long as the heat insulating sheets 12 and 12c has a bag shape wrapping the rubber sheet 13, and for example, a form in which each of the heat insulating sheets 12 and 12c includes three bonded parts 5 or 5a respectively extending outward from three sides out of four sides forming the outer circumference of the rubber sheet 13 and each of the bonded parts 5 and the bonded parts 5a is folded back and is bonded to each other may be employed. In this case, the heat insulating sheets 12 and 12c have a bag shape opened on sides where no bonded parts 5 and 5a are provided. The bonded parts 5 and 5a are more firmly bonded to each other, and the multilayer sheet 1c can further reduce heat conduction between the heat sources and the rubber sheet 13 and can prevent burning of the rubber sheet 13 by the bonded parts 5a being folded back on the side of the facing bonded parts 5 with the rubber sheet 13 interposed therebetween and being bonded to the bonded parts 5.

Fifth Embodiment

Next, a multilayer sheet in a fifth embodiment will be described. The same reference signs will be applied to parts common to those in the above embodiments, and repeated description will be omitted.

FIG. 7 illustrates a perspective view of the multilayer sheet in the fifth embodiment. FIG. 8 illustrates each of a sectional view along the line B-B in FIG. 7 and an enlarged view of a region C thereof.

A multilayer sheet 1d in the fifth embodiment includes a first sheet member 10 configured similarly to the multilayer sheet 1 in the first embodiment and a heat conductive member 20 that is long in a length direction of end surfaces of first heat conductive sheets 11 in contact with at least the end surfaces. The first sheet member 10 is a member configured similarly to the multilayer sheet 1 in the first embodiment and is a member obtained by removing one bonded part 5 (the bonded part 5 on the lower side in this embodiment) out of the four bonded parts 5 included in the multilayer sheet 1. The heat conductive member 20 is a member that comes into contact with the end surfaces of the first heat conductive sheets 11 on the side on which bonded parts of heat insulating sheets 12 are not provided (the lower side in this embodiment).

The heat conductive member 20 preferably includes a hollow part 27 along the length direction thereof (corresponding to the width direction of the first sheet member 10). Also, the heat conductive member 20 is preferably a tubular member obtained by a second sheet member 24 being wound more than one time around the outer circumference of the hollow part 27 in a non-contact manner. In other words, the heat conductive member 20 includes an excess region 25 exceeding the length of the circumference of the outer side surface of the hollow part 27 and capable of superimposing in a non-adhesive state. The "excess region" may be referred to as an "overlapping region" or a "tongue-like portion" instead. The excess region 25 of the heat conductive member 20 has a sufficient length to enable the second sheet member 24 to maintain contact with the second sheet member 24 itself in the circumferential direction of the hollow part 27 even if the heat conductive member 20 is compressed between the heat sources and the cooling portions and becomes flat. As a result, it is possible to reliably form a heat movement route from the heat sources to the cooling portions both in left and right directions when seen from the end surface of the heat conductive member 20 in the length direction. In this embodiment, the excess region 25 is provided to come into contact with the end surface of the first sheet member 10. Note that the excess region 25 may be provided on the opposite side (the lower side in FIG. 7) of the end surface of the first sheet member 10 instead of the position illustrated in FIG. 7.

The heat conductive member 20 includes the second heat conductive sheets 21 covering the outer surface thereof. The first heat conductive sheets 11 and the second heat conductive sheets 21 are preferably a continuous sheet. Also, the heat conductive member 20 is preferably a member obtained by the rubber sheet 13, the heat insulating sheets 12, and the first heat conductive sheets 11 being extended. In other words, the second sheet member 24 configuring the heat conductive member 20 is configured with the first heat conductive sheets 11 (the second heat conductive sheets 21), the heat insulating sheets 12, and the rubber sheet 13 similarly to the first sheet member 10. Also, the first sheet member 10 and the second sheet member 24 are preferably a continuous sheet. Therefore, the multilayer sheet 1d is a member in which the first sheet member 10 and the heat conductive member 20 obtained by the second sheet member 24 wound more than one time around the outer circumference of the hollow part 27 in a non-contact manner are formed with one sheet. Note that the shape of the heat conductive member 20 when seen from the opening thereof may be an oval shape, a long circular shape, or a rectangular shape. The same applies to the heat conductive members described later.

Sixth Embodiment

Next, a multilayer sheet in a sixth embodiment will be described. The same reference signs will be applied to parts common to those in the above embodiments, and repeated description will be omitted.

FIG. 9 illustrates each of a sectional view of the multilayer sheet in the sixth embodiment in the same view as that in FIG. 2 and an enlarged view of a region D thereof.

A multilayer sheet 1e in the sixth embodiment includes a first sheet member 10 and a heat conductive member 20a that is long in a length direction of end surfaces of first heat conductive sheets 11 in contact with at least the end surfaces similarly to the fifth embodiment. The multilayer sheet 1e is different from the multilayer sheet 1d in the fifth embodiment in that the heat conductive member 20a includes a cushion member 26. Since the other configurations are the same as those in the aforementioned embodiments, detailed description will be omitted.

The heat conductive member 20a includes a cushion member 26 provided inside the second heat conductive sheets 21, preferably inside the second sheet member 24 and is more easily deformed than the second heat conductive sheets 21. The cushion member 26 is a tubular cushion member including a hollow part 27a that is long in the length direction of the heat conductive member 20a. The hollow part 27a is a penetrating path penetrating the cushion member 26 in the length direction in this embodiment. However, the hollow part 27a may be blocked on at least one side of both ends in the length direction thereof. Also, the cushion member 26 may have a solid shape (also referred to as a columnar shape) without including the hollow part 27a in the length direction thereof.

Important functions of the cushion member 26 are easiness of deformation and a returning force. The returning force depends on elastic deformability of the cushion member 26. The easiness of deformation is a necessary property for following the shapes of the heat sources, and in a case of a battery cell in which a content with a semi-solid and liquid characteristics is accommodated in a package that is easily deformed, such as a lithium battery, in particular, the designed dimension is irregular, or dimension precision cannot be enhanced in many cases. Therefore, it is important to hold the easiness of deformation and the returning force to hold the following force of the cushion member 26.

The cushion member 26 has a function of obtaining satisfactory contact between the second heat conductive sheets 21 and the heat sources even when the heat sources that come into contact with the heat conductive member 20a is not flat. Further, the hollow part 27a facilitates the deformation of the cushion member 26 and moreover, contributes to weight reduction of the multilayer sheet 1a. The cushion member 26 also has a function of a protective member to prevent the second heat conductive sheets 21 from causing breakage or the like due to a load applied from the heat sources to the second heat conductive sheets 21. The cushion member 26 is more easily elastically deformed than the second heat conductive sheets 21, and cracking and cleavages are unlikely to occur due to deformation caused by pressurization from the heat sources and releasing thereof. The cushion member 26 can thus curb a situation in which cracking occurs in the second heat conductive sheets 21. Note that the cushion member 26 is a member with lower heat conductivity than the second heat conductive sheets 21.

The cushion member 26 is preferably configured to contain a thermosetting elastomer such as silicone rubber, urethane rubber, isoprene rubber, ethylene-propylene rubber, natural rubber, ethylene-propylene-diene rubber, nitrile rubber (NBR), or styrene-butadiene rubber (SBR); a urethane-based, ester-based, styrene-based, olefin-based, butadiene-based, fluorine-based thermoplastic elastomer or the like; a composite thereof; or the like. The cushion member 26 is preferably configured with a material with high heat resistance in such a level that the form thereof can be maintained without causing melting, decomposition, or the like due to heat transmitted through the second sheet member 24. In this embodiment, the cushion member 26 is more preferably configured with silicone impregnated with a urethane-based elastomer or silicone rubber. The cushion member 26 may be configured such that a filler, representative examples of which include $Al_2O_3$, AlN, cBN, hBN, and diamond particles, is dispersed in rubber in order to enhance the heat conductivity thereof even a little bit. The cushion member 26 may contain air bubbles therein or may not contain air bubbles therein. Also, the "cushion member" means a member that has sufficient flexibility and is elastically deformable such that the cushion member can come into tight contact with the surfaces of the heat sources, and in such a sense, the "cushion member" can be replaced with a "rubber-like elastic body". Further, the cushion member 26 can be configured using metal instead of the aforementioned rubber-like elastic body in a modification example. The cushion member 26 can also be configured with a sponge formed from such as a resin or rubber or a solid (with a structure that is not porous like a sponge).

2. Cell Unit and Battery

Next, suitable embodiments of a cell unit and a battery including the cell unit in the invention will be described.

First Embodiment

FIG. 10 illustrates a perspective view of a cell unit in the first embodiment. FIG. 11 illustrates a sectional view along the line E-E in FIG. 10. FIG. 12 illustrates a vertical sectional view of a battery including the cell unit in the first embodiment. Here, the "vertical sectional view" means a view of the battery cut in a length direction of a battery cell inside a casing of the battery.

A cell unit 30 in this embodiment is a cell unit including the multilayer sheets 1 in the aforementioned first embodiment. The cell unit 30 includes a plurality of battery cells (hereinafter, referred to as "cells") 50 as heat sources and the multilayer sheets 1 disposed at least between the plurality of cells 50. The cell unit 30 is preferably a member in which the cells 50 are disposed between the multilayer sheets 1 in a state in which the plurality of multilayer sheets 1 are provided to stand like folds. Note that the cell unit 30 may include a base sheet on which the plurality of multilayer sheets 1 and the cells 50 are placed. In other words, the cells 50 may be disposed between the multilayer sheets 1 in a state in which the plurality of multilayer sheets 1 are provided to stand on the base sheet in the cell unit 30. In this case, the base sheet may have the same configuration as that of the first heat conductive sheets 11 and/or the second heat conductive sheets 21 or may a configuration similar to that of the multilayer sheet 1.

A battery 40 including the cell unit 30 in this embodiment includes the cell unit 30 in a casing 41 with a structure of causing a coolant 45 to flow therethrough. The battery 40 is, for example, a battery for an electric car and includes multiple cells 50. The battery 40 preferably includes a bottomed casing 41 opened on one side. The casing 41 is preferably made of aluminum or an aluminum group alloy. The cells 50 are disposed inside 44 the casing 41. Electrodes (not illustrated) are provided to project above the cells 50. The plurality of cells 50 preferably come into tight contact with each other with a force applied in a compressed direction using screws or the like from both sides thereof in the casing 41 (not illustrated). One or a plurality of water cooling pipes 43 is provided at a bottom part 42 (an example of a cooling portion) of the casing 41 to cause cooling water as an example of the cooling agent 45 to flow therethrough. The cooling agent 45 may be referred to as a cooling medium or a cooling member. The cells 50 are disposed in the casing 41 with the multilayer sheets 1 interposed between adjacent cells 50.

In the battery 40 with such a structure, heat of the cells 50 is transmitted to the casing 41 through the multilayer sheets 1 and is effectively removed through water cooling. Since the multilayer sheets 1 are disposed between the cells 50 in the battery 40, and even when one cell 50 causes abnormal heat generation or firing, the heat insulating sheets 12 configuring the multilayer sheets 1 can reduce heat conduction to the adjacent cells 50. Also, since the bonded parts 5 of the heat insulating sheets 12 are bonded to each other to wrap the rubber sheets 13, it is possible to reduce heat conduction between the cells 50 and the rubber sheets 13. In addition, even when the cells 50 expand at the time of charging or discharging (at the time of heat generation) of the cells 50, the multilayer sheets 1 can follow the shapes of the cells 50 with the rubber sheets 13. It is thus possible to reduce heat conduction between the plurality of cells 50 and between the cells 50 and the rubber sheets 13 and to enhance efficiency of heat transmission from the cells 50. Note that the cooling agent 45 is not limited to the cooling water and is interpreted as including an organic solvent such as liquid nitrogen or ethanol. The cooling agent 45 is not limited to liquid and may be gas or a solid in a situation where the cooling agent 45 is used for cooling. The cell unit 30 may include a plurality of multilayer sheets 1a or 1c in the aforementioned second embodiment or fourth embodiment instead of the multilayer sheets 1. The cell unit 30 may include two or more types of sheets out of the multilayer sheets 1, 1a, and 1c in a mixed manner.

Second Embodiment

Next, a cell unit and a battery including the cell unit in the second embodiment will be described. The same reference signs will be applied to parts common to those in the above embodiment, and repeated description will be omitted.

FIG. 13 illustrates a sectional view of a cell unit in the second embodiment in the same view as that in FIG. 11. FIG. 14 illustrates a vertical sectional view of a battery including the cell unit in the second embodiment.

A cell unit 30a in this embodiment is a cell unit including the multilayer sheets 1b in the aforementioned third embodiment. The cell unit 30a includes a plurality of cells 50 as heat sources and the multilayer sheets 1b disposed at least between the plurality of cells 50. The cell unit 30a is preferably a member in which the cells 50 are disposed between the multilayer sheets 1b in a state in which the plurality of multilayer sheets 1b are provided to stand like folds. Note that the cell unit 30a may include a base sheet on which the plurality of multilayer sheets 1b and the cells 50 are placed similarly to the cell unit 30 in the aforementioned first embodiment.

A battery 40a including the cell unit 30a in this embodiment includes the cell units 30a in a casing 41 with a structure of causing a cooling agent 45 to flow therethrough similarly to the battery 40 in the first embodiment. The cells 50 are disposed inside the casing 41 with the multilayer sheets 1b interposed between adjacent cells 50. The multilayer sheets 1b are disposed inside the casing 41 such that end surfaces on the side on which the bonded parts 5 of the heat insulating sheets 12b are not provided (the lower side in this embodiment) come into contact with a bottom part 42. In the battery 40a with such a structure, heat of the cells 50 is transmitted to the inside of the casing 41 through the multilayer sheets 1b and is effectively removed through water cooling. Also, since the bonded parts 5 of the heat insulating sheets 12b are bonded to each other to wrap the rubber sheets 13, it is possible to reduce heat conduction between the cells 50 and the rubber sheets 13. In addition, since the multilayer sheets 1b are disposed such that the end surfaces on the side on which the bonded parts 5 are not provided come into contact with the bottom part 42, heat generated due to abnormal heat generation or firing of the cells 50 is removed through water cooling in the cooling portion (bottom part 42) before being transmitted to the rubber sheets 13. The battery 40a can thus reduce heat conduction between the plurality of cells 50 and between the cells 50 and the rubber sheets 13 and to enhance efficiency of heat transmission from the cells 50 similarly to the battery 40 in the first embodiment. Note that a plurality of sheets in each of which one bonded part 5 or 5a out of the four bonded parts 5 or 5a included in the multilayer sheet 1 or 1c in the aforementioned first embodiment or fourth embodiment is removed may be included in the cell unit 30a instead of the multilayer sheets 1b. In this case, the cell unit 30a is preferably disposed inside the casing 41 such that the end surfaces on the side on which the bonded parts 5 or 5a are not provided come into contact with the bottom part 42.

Third Embodiment

Next, a cell unit and a battery including the cell unit in the third embodiment will be described. The same reference signs will be applied to parts common to those in the above embodiments, and repeated description will be omitted.

FIG. 15 illustrates a perspective view of the cell unit in the third embodiment. FIG. 16 illustrates a sectional view along the line F-F in FIG. 15. FIG. 17 illustrates a vertical sectional view of a battery including the cell unit in the third embodiment.

A cell unit 30b in this embodiment is a cell unit including the multilayer sheets 1d in the aforementioned fifth embodiment. The cell unit 30b includes a plurality of cells 50 as heat sources and the multilayer sheets 1d disposed at least between the plurality of cells 50. The cell unit 30b is preferably disposed in a state in which the plurality of multilayer sheets 1d are provided to stand. The cells 50 are disposed between the multilayer sheets 1d.

A battery 40b including the cell unit 30b in this embodiment includes the cell unit 30b in a casing 41 with a structure of causing a cooling agent 45 to flow therethrough similarly to the battery 40 or 40a in each of the aforementioned embodiments. The cells 50 are disposed inside the casing 41 with the heat conductive members 20 interposed between the cells 50 themselves and a bottom part 42. Also, the cells 50 are disposed inside the casing 41 with the first sheet members 10 interposed between adjacent cells 50. In the multilayer sheets 1d, the heat conductive members 20 include excess regions 25. The heat conductive members 20 are provided between the cells 50 and the casing 41 such that the excess regions 25 of the heat conductive members 20 come into contact with either the cells 50 or the casing 41 (specifically, the bottom part 42 in this embodiment). In this embodiment, the heat conductive members 20 are provided in the casing 41 in a state in which the heat conductive members 20 are sandwiched between the cells 50 and the bottom part 42 with the excess regions 25 directed to the side of the cells 50.

FIG. 18 illustrates an enlarged view of the region G in FIG. 17. Note that FIG. 18 illustrates a part of the heat conductive members 20 in an enlarged manner.

In the battery 40b, heat of the cells 50 is transmitted to the casing 41 through the multilayer sheets 1d and is effectively removed through water cooling. More specifically, the heat conductive members 20 are included in the casing 41 in a state in which the heat conductive members 20 are sandwiched between the cells 50 and the bottom part 42 with the excess regions 25 directed to the side of the cells 50. Therefore, the heat from the cells 50 is transmitted from the excess regions 25 to the bottom part 42 along the circumferences on both sides (see the routes H1 and H2 in the drawing). It is thus possible to reliably increase the heat transmission routes and thus to further enhance heat dissipation from the cells 50. Also, since the first sheet members 10 of the multilayer sheets 1d are disposed between the cells 50 in the battery 40b, the heat insulating sheets 12 configuring the first sheet members 10 can reduce heat conduction to the adjacent cells 50 even in a case in which abnormal heat generation, firing, or the like occurs in one cell 50. In addition, since the bonded parts 5 of the heat insulating sheets 12 are bonded to each other to wrap the rubber sheets 13, it is possible to reduce heat conduction between the cells 50 and the rubber sheets 13. Moreover, even when the cells 50 expand at the time of charging or discharging (at the time of heat generation) of the cells 50, the multilayer sheets 1d can follow the shapes of the cells 50 with the rubber sheets 13. It is thus possible to reduce heat conduction between the plurality of cells 50 and to enhance efficiency of heat transmission from the cells 50.

Modification Example of Third Embodiment

Next, a modification example of the cell unit and the battery including the cell unit in the third embodiment will be described. The same reference signs will be applied to parts common to those in the above embodiments, and repeated description will be omitted.

FIG. 19 illustrates an enlarged view of a region similar to the region G in FIG. 17 in the modification example of the battery including the cell unit in the third embodiment. Note that FIG. 19 illustrates a part of the heat conductive members 20 in an enlarged manner.

The cell unit 30b in this modification example is different from the cell unit 30b in the third embodiment in that the excess regions 25 of the multilayer sheets 1d are provided on the other side of the end surfaces of the first sheet members 10 (the lower side in FIG. 19). Therefore, the heat conductive members 20 are disposed such that the excess regions 25 are directed to the side of the bottom part 42 in the battery 40b in this modification example. Even in such a disposition form, heat from the cells 50 is transmitted on both sides of the heat conductive members 20 in the circumferential direction and is then transmitted to the bottom part 42 (see the routes H1 and H2 in the drawing). It is thus possible to further enhance heat dissipation from the cells 50 similarly to the third embodiment.

Fourth Embodiment

Next, a cell unit and a battery including the cell unit in the fourth embodiment will be described. The same reference signs will be applied to parts common to those in the above embodiments, and repeated description will be omitted.

FIG. 20 illustrates a sectional view of the cell unit in the fourth embodiment in the same view as that in FIG. 16. FIG. 21 illustrates a vertical sectional view of a battery including the cell unit in the fourth embodiment.

A cell unit 30c in this embodiment is a cell unit including the multilayer sheets 1e in the aforementioned sixth embodiment. The cell unit 30c includes a plurality of cells 50 as heat sources and multilayer sheets 1e disposed at least between the plurality of cells 50. The cell unit 30c is different from the cell unit 30b in the third embodiment in that the multilayer sheets 1e are included instead of the multilayer sheets 1d. More specifically, the cell unit 30c is different from the cell unit 30b in the third embodiment in that the heat conductive members 20a of the multilayer sheets 1e include cushion members 26. Since the other configurations are similar to those in the aforementioned third embodiment, detailed description will be omitted.

A battery 40c including the cell unit 30c in this embodiment includes the cell unit 30c inside a casing 41 with a structure of causing a cooling agent 45 to flow therethrough similarly to the battery 40b in the third embodiment. The cells 50 are disposed inside the casing 41 with the heat conductive members 20a interposed between the cells 50 themselves and the bottom part 42. Also, the cells 50 are disposed inside the casing 41 with the first sheet members 10 interposed between adjacent cells 50. In the multilayer sheets 1e, the heat conductive members 20a include excess regions 25. The heat conductive members 20a are provided between the cells 50 and the casing 41 such that the excess regions 25 of the heat conductive members 20a come into contact with either the cells 50 or the casing 41 (specifically, the bottom part 42 in this embodiment). In this embodiment, the heat conductive members 20a are provided in the casing 41 in a state in which the heat conductive members 20a are sandwiched between the cells 50 and the bottom part 42 with the excess regions 25 directed to the side of the cells 50. Note that the heat conductive members 20a may be included inside the casing 41 in a state in which the heat conductive members 20a are sandwiched between the cells 50 and the bottom part 42 with the excess regions 25 directed to the side of the bottom part 42 similarly to the aforementioned modification example of the cell unit 30b and the battery 40b in the third embodiment (see FIG. 19).

3. Other Embodiments

Although each suitable embodiment of the present invention has been described as above, the present invention is not limited thereto and can be implemented with various modifications.

In each of the multilayer sheets 1, 1a, 1b, 1c, 1d, and 1e in each of the aforementioned embodiments, the bonding method of the three or four bonded parts 5 or 5a included in each of the heat insulating sheets 12, 12a, 12b, and 12c is not completely the same form. For example, the multilayer sheets 1, 1a, 1b, 1c, 1d, and 1e may include bonded parts 5 forming irregularities as in the second embodiment and bonded parts 5a folded back and bonded as in the fourth embodiment.

Although in the multilayer sheet 1c in the fourth embodiment, the bonded parts 5a of the heat insulating sheet 12c are folded back on the side of the bonded parts 5 of the facing heat insulating sheet 12 with the rubber sheet 13 interposed therebetween and are bonded to the bonded parts 5, the bonding method is not limited as long as one of bonded parts out of two facing bonded parts is folded back on the side of the other bonded part and is bonded to the other bonded part. For example, both the bonded parts 5 and 5a of the heat insulating sheets 12 and 12c may be folded back on the side of the bonded part 5 or the bonded part 5a in the multilayer sheet 1c. Also, in the multilayer sheet 1 in the first embodiment, the bonded parts 5 that have been bonded to each other of the heat insulating sheets 12 may be folded back on any one side of the bonded parts 5.

The forms of the heat insulating sheets 12, 12a, 12b, and 12c are not limited as long as the heat insulating sheets 12, 12a, 12b, and 12c have bag shapes wrapping the rubber sheets 13, and for example, a form in which the rubber sheets 13 are wrapped in a cloth wrapped form by the heat insulating sheets 12, 12a, 12b, and 12c may be employed.

Although the first sheet members 10 and the second sheet members 24 are formed with continuous sheets in the multilayer sheets 1d and 1e in the fifth embodiment and the sixth embodiment, the first sheet members 10 and the second sheet members 24 may not be formed with continuous sheets. In other words, the first sheet members 10 and the second sheet members 24 may be formed with separate sheets and may be secured using a fixing means such as a heat-resistant adhesive or a double-sided tape or may come into contact with each other without using any fixing means.

Although the second sheet members 24 in the multilayer sheets 1d and 1e in the fifth embodiment and the sixth embodiment are configured with the second heat conductive sheets 21, the heat insulating sheets 12, and the rubber sheets 13 similarly to the first sheet member 10, the second sheet members 24 may include any one of the heat insulating sheets 12 and the rubber sheets 13 or may not include the heat insulating sheets 12 and the rubber sheets 13 as long as the second sheet members 24 include at least the second heat conductive sheets 21. Also, the second heat conductive sheets 21 may not be the sheets of the same components as those of the first heat conductive sheets 11 as long as the sheets have more excellent heat conductivity than at least the heat insulating sheets 12 and the rubber sheets 13.

Although the heat conductive members 20 and 20a in the multilayer sheets 1d and 1e in the fifth embodiment and the sixth embodiment include the hollow parts 27 and 27a, the hollow parts 27 and 27a may not be included.

Although the multilayer sheets 1d and 1e in the fifth embodiment and the sixth embodiment include the first sheet members 10 configured similarly to the multilayer sheet 1 in the first embodiment, the invention is not limited thereto, and members configured similarly to the multilayer sheets 1a, 1b, and 1c in the second to fourth embodiments may be included as the first sheet members 10.

In the batteries 40b and 40c including the cell units 30b and 30c in the third embodiment and the fourth embodiment, the excess regions 25 of all the heat conductive members 20 and 20a are directed to the side of the lower ends of the cells 50 or the side of the bottom part 42 of the casing 41. However, the excess regions 25 of a part of the heat conductive members 20 and 20a may be directed to the side of the lower ends of the cells 50 while the excess regions 25 of the remaining heat conductive members 20 and 20a may be directed to the side of the bottom part 42.

Although the heat conductive members 20 and 20a in the multilayer sheets 1d and 1e in the fifth embodiment and the sixth embodiment include the excess regions 25, the excess regions 25 may not be included. In other words, the heat conductive members 20 and 20a may be tubular members obtained by the second sheet members 24 wound one time around the outer circumference of the hollow part 27 and the cushion member 26. Although all the heat conductive members 20 and 20a in the batteries 40b and 40c including the cell units 30b and 30c in the third embodiment and the fourth embodiment include the excess regions 25, only a part of the heat conductive members 20 and 20a may include the excess regions 25. Moreover, the heat conductive members 20 and 20a may be closed tubular or columnar members with closer circular shapes, closed oval shapes, closed long circular shapes, or closed rectangular shapes when seen from the openings thereof.

Also, the heat sources include not only the cells 50 but also all targets that generate heat, such as a circuit substrate and an electronic device main body. For example, the heat sources may be electronic components such as capacitors or IC chips. Similarly, the cooling agent 45 is not limited to cooling water and may be an organic solvent, liquid nitrogen, or cooling gas. Also, the multilayer sheets 1, 1a, 1b, 1c, 1d, and 1e and the cell units 30, 30a, 30b, and 30c may be disposed in structures other than the batteries 40, for example, electronic devices, home appliances, or power generators.

A plurality of components in each of the aforementioned embodiments can be freely combined except for a case in which such combinations are not possible. For example, the multilayer sheets 1a may be included in the cell unit 30.

INDUSTRIAL APPLICABILITY

The multilayer sheet and the cell unit in the present invention can also be used, for example, for various electronic devices in a car, an industrial robot, a power generator, a PC, a household electrical appliance and the like as well as a car battery. Also, the multilayer sheet and the cell unit in the present invention can be used for a household chargeable/dischargeable battery or a battery for an electronic device such as a PC other than a car battery.

The invention claimed is:

1. A multilayer sheet disposed at least between a plurality of heat sources and capable of conducting heat from the heat sources, comprising:
    a rubber sheet made of a rubber-like elastic body;
    heat insulating sheets laminated on both surfaces of the rubber sheet and capable of reducing heat conduction between the plurality of adjacent heat sources; and
    first heat conductive sheets laminated outside the heat insulating sheets in a separated manner and having higher heat conductivity than that of the rubber sheet and the heat insulating sheets,
    wherein
        the heat insulating sheets wrap the rubber sheet and include bonded parts extending outward beyond an edge part of the rubber sheet, and
        the bonded parts of the heat insulating sheet are bonded with a continuous area of cavities and protrusions.

2. The multilayer sheet of claim 1, further comprising:
    a heat conductive member on end surfaces of the first heat conductive sheets in contact with at least the end surfaces,
    wherein the heat conductive member includes a second heat conductive sheet covering an outer surface thereof.

3. The multilayer sheet of claim 2,
    wherein the heat conductive member includes a hollow part along a length direction thereof, and
    the heat conductive member is a tubular member wound more than one time around an outer circumference of the hollow part in a non-contact state.

4. The multilayer sheet of claim 2, wherein
    the heat conductive member is included inside the second heat conductive sheet,
    the heat conductive member includes
        a cushion member that is more easily deformed than the second heat conductive sheet and
        a hollow part along a length direction of the heat conductive member, and
    the cushion member is a tubular cushion member including the hollow part that is in the longitudinal direction of the heat conductive member.

5. The multilayer sheet of claim 2, wherein the first heat conductive sheets and the second heat conductive sheet are a continuous sheet.

6. The multilayer sheet of claim 1, wherein the heat insulating sheet is a sheet of silica aerogel or a sheet containing silica aerogel.

7. The multilayer sheet of claim 1, wherein the rubber sheet is a sheet containing silicone rubber.

8. The multilayer sheet of claim 1, wherein the rubber sheet is a sheet of foamed rubber.

9. A cell unit comprising:
    a plurality of cells as heat sources; and
    the multilayer sheet of claim 1 disposed at least between the plurality of cells.

* * * * *